United States Patent [19]

Macari et al.

[11] 4,071,104
[45] Jan. 31, 1978

[54] SCALE ADJUSTMENT DEVICE

[75] Inventors: Leonard J. Macari, Stamford; Louis T. Canevari, Norwalk, both of Conn.

[73] Assignee: Pitney-Bowes, Inc., Stamford, Conn.

[21] Appl. No.: 735,581

[22] Filed: Oct. 26, 1976

[51] Int. Cl.² .................. G01G 3/08; G01G 23/14
[52] U.S. Cl. .................................. 177/229; 177/169
[58] Field of Search ............................. 177/169, 229

[56] References Cited

U.S. PATENT DOCUMENTS

| | | | |
|---|---|---|---|
| 200,386 | 2/1878 | Fredericks | 177/169 |
| 612,968 | 10/1898 | Hansen | 177/169 |
| 729,207 | 5/1903 | Mulligan | 177/169 |
| 1,116,268 | 11/1914 | Hansen | 177/169 |
| 1,332,116 | 2/1920 | Ewing | 177/169 |
| 3,181,634 | 5/1965 | Williams | 177/169 |
| 3,807,517 | 4/1974 | Freeman | 177/169 |
| 4,022,288 | 5/1977 | Canevari | 177/229 |

Primary Examiner—George H. Miller, Jr.
Attorney, Agent, or Firm—Robert S. Salzman; William D. Soltow, Jr.; Albert W. Scribner

[57] ABSTRACT

A combination of a leaf spring scale and an ajustment spring device for varying or otherwise correcting manufacturing tolerance differences effecting the spring rate of the leaf springs of the scale. Manufactured leaf springs can have a widely divergent spring rate even with small differences in thickness. The adjustment spring device in combination with the leaf springs provides a combined or overall spring rate which is the same for each scale.

6 Claims, 3 Drawing Figures

SCALE ADJUSTMENT DEVICE

The invention relates to leaf spring scales, and more particularly to an adjustment device for correcting manufacturing differences in the leaf springs, which manufacturing differences effect the spring rate of the scale.

BACKGROUND OF THE INVENTION

In the past, many devices have been proposed for correcting operational errors for scales. Usually these devices include adding additional compensatory springs, such as may be seen in the patent to: Gerald C. Freeman; U.S. Pat. No. 3,807,517; issued Apr. 30, 1974.

Recently, there has been invented a scale whose leaf springs are automatically self-compensating for errors in the spring rate over the entire weighing range. Such a scale is shown in the U.S. Pat. No. 4,022,288 to Louis T. Canevari.

Although the latter invention eliminates the operational errors of the scale, there still exists inherent errors due to differences in manufacture, i.e. manufacturing tolerances which initially change the spring constant. For example, a manufacturing tolerance of ± 0.002 inches at 0.047 inch thickness in the thickness of the leaf springs is enough to affect the initial spring rate by 20%. The above tolerance is quite common, and therefore, ways have been devised to compensate for this type of distortion. One method is to place an adjustment spring of the type suggested in the aforementioned patent application. However, a different compensatory spring rate is needed for each scale, thus requiring an individual matching and testing of adjustment springs for each scale.

In order to eliminate this burdensome chore, the subject invention has conceived of an easily adjustable compensation spring. This compensation spring has an adjustable spring rate, that when added to the spring rate of the leaf springs will provide the desired spring constant for the scale system.

SUMMARY OF THE INVENTION

The invention relates to an apparatus for correcting for differences in the spring rates of leaf spring scales. The differences in spring rates are a result of manufacturing tolerances. As aforementioned, a manufacturing tolerance of ± 0.002 inches in the thickness of the leaf springs (0.047 inches thick) is enough to change the spring rate for the scale by as much as 20%.

The invention provides an adjustment spring in combination with the twin leaf spring scale which was previously described in patent application Ser. No. 661,981; filed: Feb. 27, 1976. The adjustment or compensation spring is operatively connected between the movable weighing pan of the scale and the scale support. The adjustment spring includes a coil spring having a support on one end. A screw thread is attached to the spring support, and extends through the middle of the coil spring. A rotative nut-like element is rotatively disposed upon the screw thread, and extends between coil elements of the coil spring. The nut-like element is rotatively adjustable to different positions upon the screw thread. In being so positioned, the working length of the coil spring is varied, and hence, the spring rate of the coil spring is likewise varied.

The adjustment spring means in combination with the twin leaf springs of the scale can effectively adjust an over all spring rate of the scale. The adjustment spring will correct for inherent differences in manufacturing tolerances of the leaf springs.

It is an object of this invention to provide a combination leaf spring scale and an adjustment apparatus for adjusting inherent differences in the spring rate of the leaf spring scale; and It is another object of the invention to provide a spring rate adjustment device for a leaf spring scale which will correct for manufacturing tolerance differences in the leaf springs.

These and other objects of this invention will be better understood and will become more apparent with reference to the following detailed description taken in conjunction with the accompanying drawings, in which.

DETAILED DESCRIPTION

Figure 1:
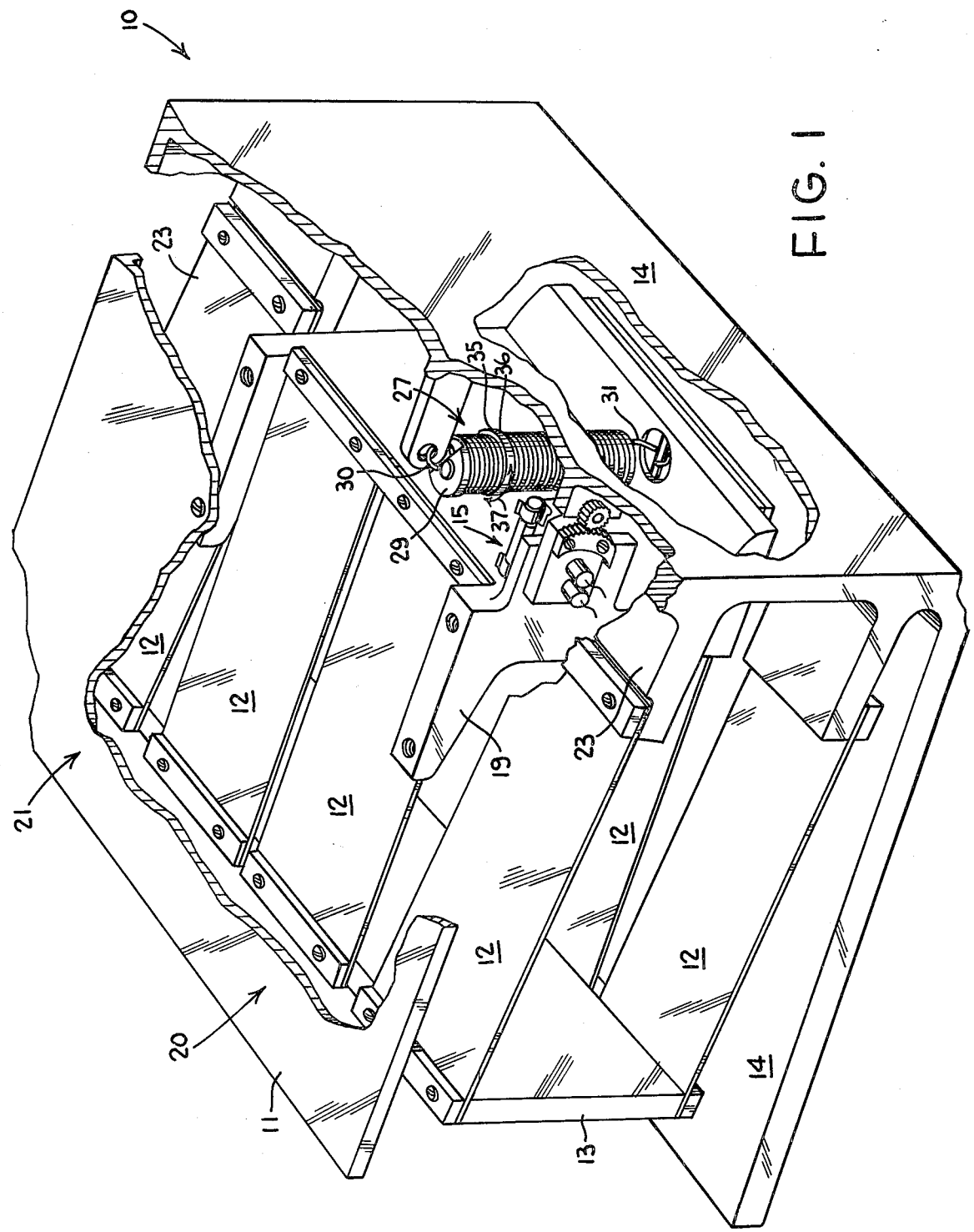
FIG. 1 is a perspective view of the leaf spring scale and adjustment spring combination of this invention.
Figure 2:
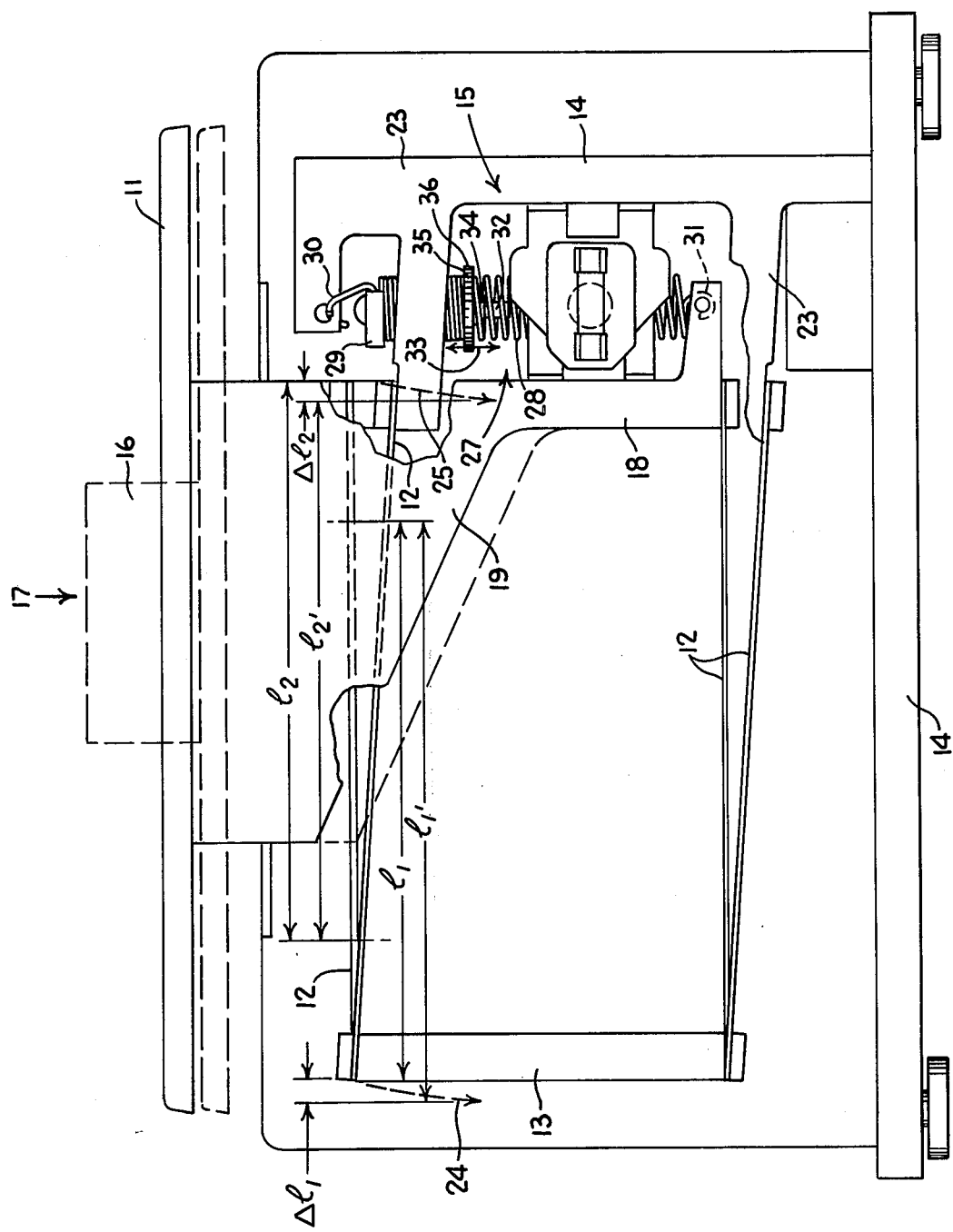
FIG. 2 is a front view of FIG. 1.

Referring to FIGS. 1 and 2, a Box-like leaf spring scale 10 is illustrated with an adjustable spring mechanism 27 in combination.

The scale basically consists of a weighing pan 11, a combination of leaf spring strips 12, a common tare support 13, a scale frame 14, and a deflection measuring apparatus 15.

For most leaf spring scales, the spring constant "K" is usually given by the following equation:

$$K = t^3 EW/l^3$$

where:

$t$ is the thickness of the leaf springs;
$E$ is Young's Modulus for the springs;
$W$ is the width of the leaf springs; and
$l$ is the length of the leaf springs.

It will be evident from the above equation that where the thickness ($t$), Young's Modulus (E), and width (W) are kept constant, the only parameter effecting the spring constant is the length ($l$).

In leaf spring scales, the leaf spring are usually anchored about a frame support, and are pivotable about this supported end. The effective bending length of the springs tends to change as the springs deflect, because the outer movable end of the springs travel through an arc. The change in effective bending length, and hence, the change in spring constant "K", becomes a function of the cosine of the arc angle.

The springs can be combined in such a way as to cancel any change in the spring constant over the weighing range. In other words, a portion of the spring combination will be fabricated to have a negative change in spring rate, while a complementary portion of the spring combination will have a corresponding positive change throughout a weight deflection range.

Referring again to FIGS. 1 and 2, the pan 11 is caused to deflect (arrow 17) to a position shown by the phantom lines in FIG. 2, under the influence of load 16. The pan 11 is connected to a movable spring support 16 via a cross bar 19. The movable spring support 18 cooperates with the other movable spring support 13 to form two twin parallelogram structures with spring strips 12.

There are eight leaf spring strips in the inventive construction. Other constructions are possible, however, within the limits of the inventive concept. This particular arrangement of leaf springs is also designed to reduce bending distortions due to lateral shifts of the load 16 upon pan 11.

The spring design has an inner leaf spring parallelogram 20 (FIG. 1) which comprises two upper and two lower spring strips 12. This portion of the spring construction has a decreasing spring constant, as will be further explained with reference to FIG. 2. Two outer spring parallelogram 21 and 22 are positioned on either side of parallelogram 20 as shown. This portion of the spring construction has an increasing spring constant.

Support 13 joins the parallelograms 21 and 22 to the parallelogram 20 in a tandem fashion. Springs 12 of parallelograms 21 and 22 are joined to the frame 14 by means of frame extensions 23.

As will be evident from FIGS. 1 and 2, the springs 12 of the outer parallelograms 21 and 22 extend at an upward angle from the horizontal. The springs 12 of the inner parallelgram 20 extend coincident with the horizontal axis.

Each spring strip will have an effective bending length defined as approximately 80% of the total structural length. The outer parallelograms 21 and 22 have an effective bending length defined by "$l_1$", (FIG. 2) in the $l$ rest condition (no deflection). As the pan 11 caused to deflect, the springs 12 of the outer parallelograms will deflect through an increasing arc shown by arrow 24. The effective bending length of these springs will increase in length by an amount defined as $\Delta l_1$. The new increased spring length is defined as $l_1'$.

As the outer parallelograms deflect the inner parallelogram also deflects, because both inner and outer parallelograms are supported upon the common movable support 13.

The inner parallelogram 20 has spring strips 12 that have an effective bending length $l_2$ in the rest position. When the pan deflects, these springs deflect through a decreasing arc 25 (FIG. 2). The inner springs 12 will then decrease in length by an amount $\Delta l_2$. The new decreased spring length is now give as $l_2'$.

If all the springs 12 (both inner and outer parallelograms) are made the same, i.e. have the same parameters of length, width, and Young's Modulus, then it follows for all deflection positions in the weighing range, that:

$$\Delta l_1 = - \Delta l_2$$

$$\text{and } l_1' + l_2' = l_1 + l_2$$

Therefore, it will be evident that the total spring distortion will be equal to zero throughout the weighing range. In other words, the combination of leaf springs 12 will have a substantially constant spring rate, because there is no effective change in the combined bending length.

In FIG. 2, only the upper springs 12 have been shown with the designations $l_1$, $l_2$, $\Delta l_1$ and $\Delta l_2$, etc. for the purpose of brevity.

It should be noted, however, that both upper and lower spring strips 12 of each parallogram 20, 21 and 22, respectively, vary in the same manner.

The concept of combining springs to provide a zero change in effective bending length, however, does not compensate for inherent differences in the spring rate due to manufacturing tolerances. The invention, therefore, provides combining the aforementioned scale 10 with an adjustment spring 27, shown in detail in FIG. 3. The adjustment spring 27 compensates for differences in the spring rate of scale 10, by adjusting its own spring rate (increasing or decreasing it), which in combination with the scale spring rate at time of manufacture provides the desired spring rate value.

The spring adjustment device 27 includes a coil spring 28 having a spring support 29 on one end. The support end of spring 28 is attached to the frame 14 by means of hook 30. The other end of the spring 28 is connected to the movable leaf springs via hook 31.

A screw thread 32 is anchored to the spring support 29, and extends down the middle of the coil spring 28. A rotative nut 34 is rotatively disposed upon the screw thread 32, and is capable of moving up and down (arrow 33) upon the screw thread 32 when it is made to turn.

Affixed to the nut 34 is a split disc 35, which extends from the center of the coil spring 28, at the point of attachment to the nut 34, through the coils of the spring. The outer periphery of the split disc 35 is knurled, so that it can be easily gripped between the fingers.

Figure 3:
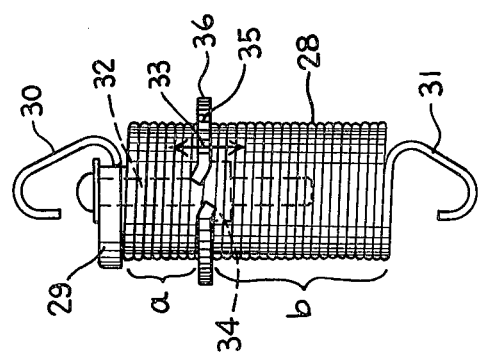
FIG. 3 is an enlarged front view of the adjustment spring shown in FIGS. 1 and 2.

Gripping the disc 35 about its knurled periphery 36, the disc 35 is made to turn, (arrows 37; FIG. 1) or rotate by the user. Since the nut 34 is fixed to the disc 35, and is rotatable upon the screw thread 32, the nut 34 will be caused to move up or down (arrows 33) upon the screw thread 32, when the disc 35 is turned. Because the disc 35 is split as shown in FIG. 3, it will slide between successive coils of the spring 28 as it is rotated, and will move up or down the coil body of the spring.

The coil portion "b" below the disc 35 (FIG. 3) is free to stretch or contract with the movement of the pan 11, but the coil portion "a" above the disc 35 is effectively "dead", i.e. the coil portion "a" is not influenced by the movement (deflection) of the pan 11. This is seen to be so, by observing that these coils (portion "a") are trapped between two fixed members, i.e. the disc 35 and the spring support 29.

The net result of turning (arrow 37) the disc 35, is therefore, to increase or decrease the working length (spring rate) of the coil spring 28.

A load 16 placed on the pan 11 will influence movement in the leaf springs and the coil spring 28 in combination. Therefore, it is obvious that a change in the spring rate of the coil spring 28 will influence the entire spring rate of the scale system. In other words, the adjustment device 27 can be used to increase or decrease the initial change in spring rate of the leaf springs that is caused by differences in the manufacturing tolerances of the springs.

The deflection of the leaf springs is measured and converted to electrical signals by the moire electroptical apparatus 15. Such a measuring device is more particularly described in application Ser. No. 655,393, filed: Feb. 5, 1976, for a "Leaf Spring Weighing Scale with Optical Detector."

Of course, other deflection measuring devices may be used, such as load cells, strain gages, etc.

All obvious modifications which will occur to those skilled in this art, are deemed to lie within those limits defining the scope ane purview of this invention, as defined by the appended claims.

What is claimed is:

1. In combination, an adjustment spring and a leaf spring scale, said adjustment spring for correcting for differences in spring rates of the leaf springs of the scale which result from differences in manufacturing tolerances, the combination comprising:

a scale support;

a weighing pan for receiving a load to be weighed, said weighing pan moving through at least a portion of a weighing range in response to said load;

a first and second leaf spring means operatively connected together for forming and effectively functioning as a unitized leaf spring means, said weighing pan being supported by said first and second leaf spring means, said first and second leaf spring means being carried by said scale support; and an adjustment spring means operatively connected between the movable weighing pan and the scale support, said adjustment spring means including a coil spring having a spring support means on one end thereof, a screw thread means affixed to the spring support means, said screw thread means extending through a middle portion of said coil spring, an adjustable rotative nut-type element rotatively disposed upon said screw thread means and extending between coil elements of said coil spring, the nut-type element being rotatively adjustable to different positions upon said screw thread means to vary an effective working length of said coil spring, and hence, to vary a spring rate of said coil spring, whereby the adjustment spring means in combination with said first and second leaf spring means can effectively adjust an overall spring rate of the scale and correct for inherent differences due to manufacturing tolerances of said first and second leaf spring means.

2. The adjustment spring and leaf spring scale combination of claim 1, wherein said first and second leaf spring means forms a parallelogram structure.

3. The adjustment spring and leaf spring scale combination of claim 1, further comprising a moire deflection measuring apparatus operatively connected between said scale support and said first and second leaf spring means.

4. The adjustment spring and leaf spring scale combination of claim 1, wherein said first and second leaf spring means each form a parallelogram structure.

5. The adjustment spring and leaf spring scale combination of claim 1, wherein said adjustable nut-type element has a knurled surface on a peripheral portion thereof for positively gripping said nut-type element and adjusting its position upon said screw thread means.

6. The adjustment spring and leaf spring scale combination of claim 1, wherein said first leaf spring means has an effective bending length that increases with movement of the weighing pan through the weighing range in response to said load, said second leaf spring means has an effective bending length that correspondingly decreases with movement of the weighing pan through the weighing range in response to said load, the increasing effective bending length of said first leaf spring means being effectively, substantially cancelled by the decreasing effective bending length of said second leaf spring means, whereby the combination of said first and said second leaf spring means provides a leaf spring arrangement having a substantially constant spring rate throughout the weighing range.

* * * * *